A. F. RAYMOND.
SNAP FASTENER.
APPLICATION FILED JULY 7, 1906.

905,457.

Patented Dec. 1, 1908.

WITNESSES:
Frank G. Parker
John Buckler

INVENTOR:
Achille François Raymond
by his attorney
Donald Campbell

UNITED STATES PATENT OFFICE.

ACHILLE FRANÇOIS RAYMOND, OF GRENOBLE, FRANCE, ASSIGNOR TO CONSOLIDATED FASTENER COMPANY, A CORPORATION OF MAINE.

SNAP-FASTENER.

No. 905,457.      Specification of Letters Patent.      Patented Dec. 1, 1908.

Application filed July 7, 1906. Serial No. 325,131.

*To all whom it may concern:*

Be it known that I, ACHILLE FRANÇOIS RAYMOND, a citizen of France, and resident of Grenoble, France, have invented a new and useful Improvement in Snap-Fasteners, of which the following, taken in connection with the accompanying drawings, is a specification.

My improvement relates to fasteners, and more particularly to snap fasteners such as comprise a socket member and a ball member adapted to be separably engaged for the purpose of holding together two articles or two portions of an article.

My present improvements relate to the novel fastener described and claimed when considered as an entirety, and also to certain features included therein which afford a greater range of application and utility; and also to specific structural details by which I attain those features.

I will first describe embodiments of my invention and then point out features of novelty in the claims.

Figure 1:
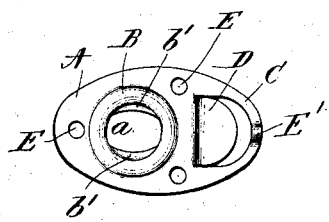
Figure 4:
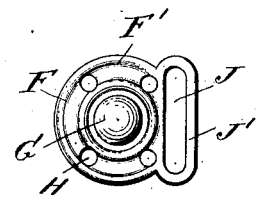
Figure 2:
Figure 5:
Figure 3:
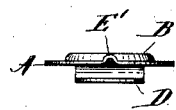
Figure 6:
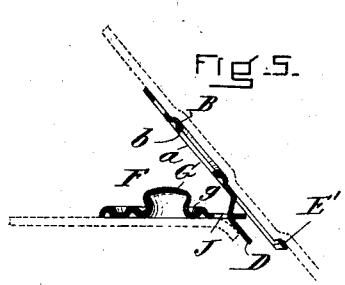
Figure 7:

In the accompanying drawings is illustrated in Figures 1 to 7 the first modification of which Fig. 1 represents in top view a socket member embodying my improvements. Fig. 2 is a central cross-section of the structure shown in Fig. 1. Fig. 3 is an end view looking from the right in Figs. 1 or 2. Fig. 4 is a top view of a complementary or ball or stud member of such a form as to engage with the aperture of the socket member shown in Figs. 1 to 3. Fig. 5 is a central cross-section of the ball member shown in Fig. 4. Fig. 6 is a central cross-section, with the fabric or leather shown in dotted lines, of the socket and ball as shown in Figs. 2 and 5 respectively, in the act of being engaged with each other. Fig. 7 is a side elevation of the same after being engaged, the fabric or leather shown in section.

Similar letters of reference designate corresponding parts of the several figures of the drawing.

The socket member A in Fig. 1 is one having a socket entrance or mouth of a special character which is of particular utility combined with a locking feature hereinafter to be described. The socket entrance or mouth shown at $a$ is surrounded by a raised wall or bead B in which the metal of the socket member is first bent upwardly and then bent downwardly so as to bring the stud engaging edge $b$ in substantially the original plane of the metal. The aperture $a$ itself is made in an elongated or elliptical form. This may conveniently be done by striking up the bead B in circular form, and providing the extra portions $b'$ of metal at opposite sides of the aperture so as to narrow the same on those sides. The socket member itself is of a generally elongated form and the long axis thereof is preferably made coincident with the long axis of the aperture $a$.

The metal of the socket member A is extended as shown at C in a lateral direction, this extension being for the purpose of providing the locking feature already referred to. One of the members, the socket or the ball, is provided with a claw or tongue, and the other with a coöperating loop. In the specific illustration in the drawings the claw is provided on the socket member as shown at D. This claw or tongue is preferably formed by striking a portion of the metal of the extension C downwardly so as to cause an offset into which the loop of the stud member may engage. Thread holes E are employed whereby the socket member may be sewed in a blind manner to the under side of the fabric. At the point E' where there is no space for a thread hole the metal is raised slightly to accommodate the thread and prevent its abrasion when engaging with or disengaging from the stud or ball. The stud or ball member F preferably comprises a flange portion F' which may be rounded at its outer edge to prevent abrasion of the thread, and in the central portion a spherical or bulbous head G having a contracted neck portion $g$. Thread holes H are provided as with the socket member for securing the same to the upper side of the fabric. As complementary to the claw D, provided on the socket member, the stud member G has a slot J which is formed by extending the metal laterally in the form of a loop as at J'.

From Fig. 6 will be understood the manner in which the ball and the socket members respectively are attached to the fabric. For engaging the two the following will be the operation: The upper member will be tilted so that the tongue or claw D will slip into the slot or loop at J. Then owing to the claw D being offset the upper or socket member may be swung about the claw and loop as a pivot and brought into normal engagement with the bulbous head of the ball. During the actual engagement the aperture *a* of the socket expands laterally owing to its oval form and the yielding nature of the raised wall surrounding it, and thus allows the ball to slip through the parts returning to their normal position owing to their resilience. As engaged with each other the parts are seen in Fig. 7 where the fabric is in section and the stitches of thread are indicated by heavy lines.

What I claim as my invention and desire to secure by Letters Patent is:

1. A snap fastener comprising a stud member and a socket member, said stud member provided with a central stud and an integral lateral slotted projection, said socket member comprising an oval plate having near one end an elliptical socket entrance surrounded by a raised wall, and near the other end a tongue upset from the body of said plate and extending in a direction opposite to said socket entrance and leaving a loop extending beyond the tongue adapted to be fastened to the material on which the fastener is used, and said tongue adapted to engage with said slot, substantially as described.

2. A sew-on snap fastener comprising a stud member and a socket member, said stud member provided with a central stud and an integral lateral slotted projection and thread holes for securing said stud member to the material, and said socket member comprising an oval plate having a socket entrance near one end and a tongue upset from the body of said plate extending in a direction opposite to said socket entrance and leaving a loop extending beyond the tongue adapted to be fastened to the material on which the fastener is used, said tongue adapted to engage with said slot, and said plate having thread holes, and said loop being provided with an indentation to receive the attaching thread for securing said socket member to the material.

In testimony whereof, I have signed my name to this specification in the presence of two subscribing witnesses, on this 13th day of June A. D., 1906.

ACHILLE FRANÇOIS RAYMOND.

Witnesses:
A. AMEON,
O. DENIS.